United States Patent
Qiu et al.

(10) Patent No.: US 7,843,809 B2
(45) Date of Patent: Nov. 30, 2010

(54) PRESERVING STABLE CALLS DURING FAILOVER

(75) Inventors: Chaoxin Qiu, Austin, TX (US); Robert Dailey, Austin, TX (US); Arshad Khan, Austin, TX (US); Jeffrey Scruggs, Round Rock, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 154 days.

(21) Appl. No.: 12/271,251

(22) Filed: Nov. 14, 2008

(65) Prior Publication Data

US 2010/0124163 A1    May 20, 2010

(51) Int. Cl.
*G01R 31/08* (2006.01)
*G06F 11/00* (2006.01)
*G08C 15/00* (2006.01)
*H04J 1/16* (2006.01)

(52) U.S. Cl. ...................................... 370/216
(58) Field of Classification Search ................... 370/216
See application file for complete search history.

(56) References Cited

U.S. PATENT DOCUMENTS 5,848,128 A * 12/1998 Frey .............................. 379/9
6,885,861 B2 * 4/2005 Koskelainen ............. 455/414.2
2004/0184452 A1 * 9/2004 Huotari et al. .............. 370/384
2008/0225835 A1 * 9/2008 Oda et al. ................... 370/352

* cited by examiner

*Primary Examiner*—Derrick W Ferris
*Assistant Examiner*—Maharishi Khirodhar
(74) *Attorney, Agent, or Firm*—Hope Baldauff Hartman, LLC

(57) ABSTRACT

According to one method for preserving stable calls during failover, during a dialog between two user endpoints, a determination is made whether a standby call processor has become operational, such as when a corresponding primary call processor is in fault. Responsive to determining that the standby call processor has become operational, a signaling protocol message is received from a requester. A determination is made whether the message includes an in-dialog signaling protocol request. Responsive to determining that the message includes the in-dialog request, a determination is made whether a call state associated with the dialog is found in memory. Responsive to determining that the call state associated with the dialog is not found in memory, a non-call terminating error response is made responding to the in-dialog request. The non-call terminating error response may cause the requester to terminate the in-dialog request but not terminate the dialog.

20 Claims, 8 Drawing Sheets

PRESERVING STABLE CALLS DURING FAILOVER

BACKGROUND

Exemplary embodiments relate generally to the field of Next Generation Networks ("NGNs"), and more specifically, to preserving stable calls in NGNs during failover.

NGNs, such as those based on the Internet Protocol ("IP") Multimedia Subsystem ("IMS") architecture designed by the 3rd Generation Partnership Project ("3GPP"), utilize general purpose servers as call control processing equipment to support Voice over IP ("VoIP"). These general purpose servers typically communicate through communications networks by way of Session Initiation Protocol ("SIP") over Transmission Control Protocol ("TCP") or User Datagram Protocol ("UDP"). These general purpose servers are commonly referred to as primary call processors.

NGNs are conventionally implemented with high redundancy of the call control processing equipment. In particular, the primary call processors may be backed up by similarly configured standby call processors. When one of the primary call processors fails, control is passed to one of the standby call processors. Further, NGNs are typically implemented with separate paths of communication—a bearer path and a control path. The bearer path supports media transmissions, such as the transmission of audio, while the control path supports call signaling commands. If a call session has been established between two parties over the NGN and one of the primary call processors fails, control is passed to one of the standby call processors which establishes a new control path, while the established call session across the bearer path may continue uninterrupted.

By implementing separate bearer and control paths, established call sessions can be preserved even after a failure in one of the primary call processors. However, stable calls can be mistakenly and prematurely torn down if call state information is requested from the standby call processor and the requested call state information cannot be found. For example, call state information may be requested if a user initiates certain feature actions, such as a flash hook, or if a SIP session timer refresh is received from another call processor.

One way to ensure that the standby call processors contain the current call state information is to replicate all call state information contained in the primary call processors in real-time or near real-time. However, this approach suffers from a number of drawbacks. Replicating all call state information introduces major processing overhead for the primary call processors, the standby call processors, and the communications network. Thus, replicating all state information is generally impractical on large NGNs. Further, call state information can be lost during replication, especially across less reliable communications networks.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the disclosure presented herein include methods, systems, and computer-readable media for preserving stable calls during failover. According to one aspect, a method for preserving stable calls during failover is provided. According to the method, during a dialog between two user endpoints, a determination is made whether a standby call processor has become operational. The standby call processor may become operational when a corresponding primary call processor is in fault. A signaling protocol message, such as a Session Initiation Protocol (SIP) message, is received from a requester after the standby call processor becomes operational. A determination is made whether the signaling protocol message includes an in-dialog signaling protocol request. Responsive to determining that the signaling protocol message includes the in-dialog signaling protocol request, a determination is made whether a call state associated with the dialog is found in memory. Responsive to determining that the call state associated with the dialog is not found in memory, a non-call terminating error response is made responding to the in-dialog signaling protocol request. The non-call terminating error response may cause the requester to terminate the in-dialog signaling protocol request but not terminate the dialog.

According to another aspect, a system for preserving stable calls during failover is provided. The system includes a memory and a processor functionally coupled to the memory. The memory stores a program containing code for preserving stable calls during failover. The processor is responsive to computer-executable instructions contained in the program and operative to determine, during a dialog between two user endpoints, whether a standby call processor has become operational; receive signaling protocol message, such as a Session Initiation Protocol (SIP) message, from a requester after the standby call processor becomes operational; determine whether the signaling protocol message includes an in-dialog signaling protocol request; responsive to determining that the signaling protocol message includes the in-dialog signaling protocol request, determine whether a call state associated with the dialog is found in memory; and responsive to determining that the call state associated with the dialog is not found in memory, return a non-call terminating error response in response to the in-dialog signaling protocol request. The standby call processor may become operational when a corresponding primary call processor is in fault. The non-call terminating error response may cause the requester to terminate the in-dialog signaling protocol request but not terminate the dialog.

According to yet another aspect, a computer-readable medium having instructions stored thereon for execution by a processor to perform a method for preserving stable calls during failover is provided. According to the method, during a dialog between two user endpoints, a determination is made whether a standby call processor has become operational. The standby call processor may become operational when a corresponding primary call processor is in fault. A signaling protocol message, such as a Session Initiation Protocol (SIP) message, is received from a requester after the standby call processor becomes operational. A determination is made whether the signaling protocol message includes an in-dialog signaling protocol request. Responsive to determining that the signaling protocol message includes the in-dialog signaling protocol request, a determination is made whether a call state associated with the dialog is found in memory. Responsive to determining that the call state associated with the dialog is not found in memory, a non-call terminating error response is made responding to the in-dialog signaling protocol request. The non-call terminating error response may cause the requester to terminate the in-dialog signaling protocol request but not terminate the dialog.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
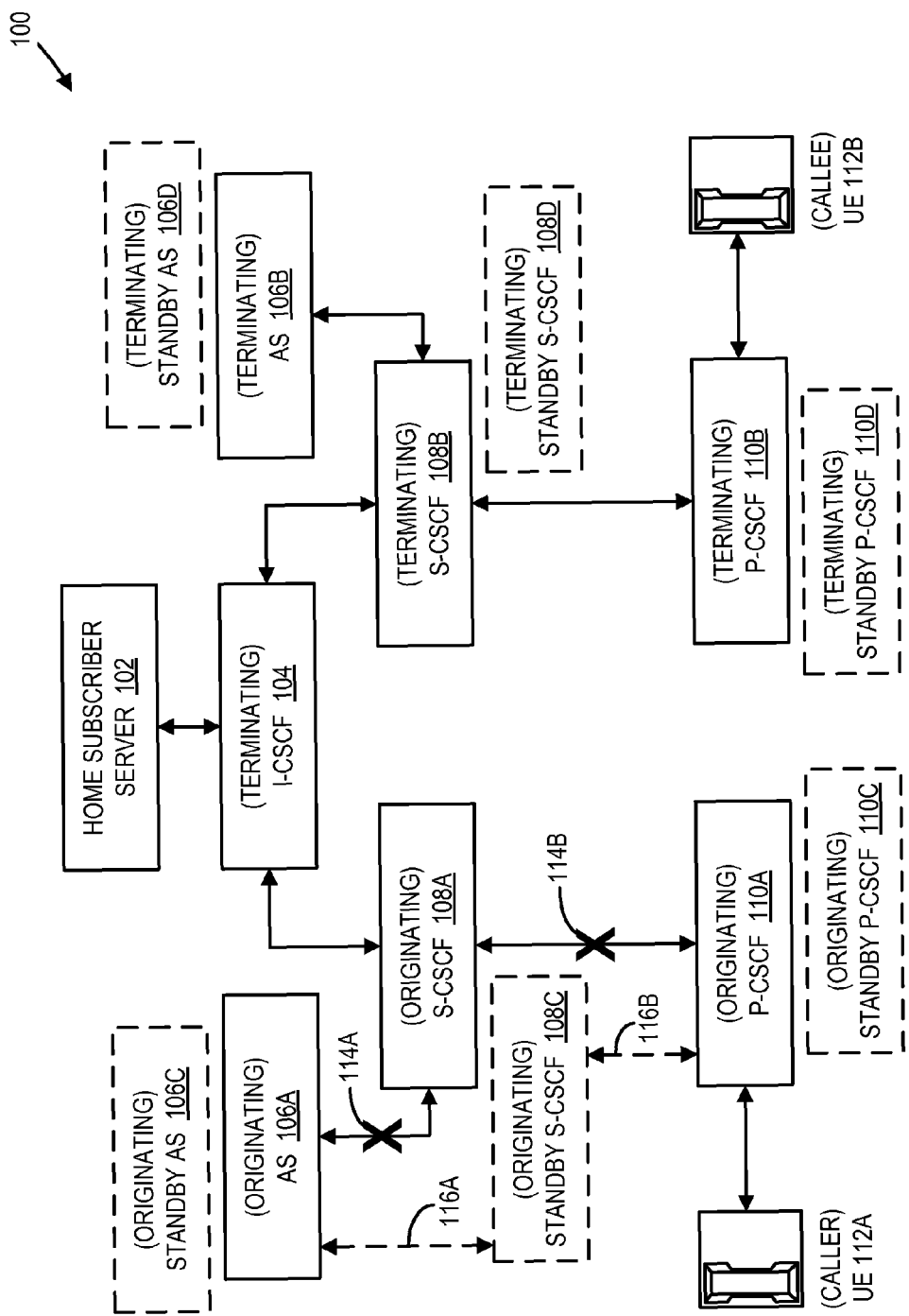
FIG. 1 is a diagram illustrating a network architecture operative to preserve stable calls during failover, in accordance with exemplary embodiments.

The following detailed description is directed to preserving stable calls during failover. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, using specific embodiments or examples. Referring now to the drawings, in which like numerals represent like elements through the several figures, aspects of a computing system and methodology for preserving stable calls during failover will be described. As used herein, a stable call refers to a call session that has been established such that at least a caller party and a callee party are in communication over the network. Also as used herein, a failover refers to the activation of a standby call processor upon the failure of a primary call processor. The terms "call session" and "dialog" are interchangeably used herein. For illustrative purposes, embodiments described herein primarily refer to communications via the SIP protocol. However, it should be appreciated that any suitable signaling protocol may be similarly utilized.

FIG. 1 shows an illustrative network architecture 100 operative to provide VoIP communications between a caller party and a callee party. The architecture 100 includes a Home Subscriber Server ("HSS") 102 operatively coupled to a terminating Interrogating Call Session Control Function ("I-CSCF") 104. The I-CSCF 104 is coupled to an originating Service Call Session Control Function ("S-CSCF") 108A and a terminating S-CSCFR 108B. An originating application server ("AS") 106A is coupled to the originating S-CSCF 108A, which is coupled to an originating Proxy Call Session Control Function ("P-CSCF") 110A. A terminating AS 106B is coupled to the terminating S-CSCF 108B, which is coupled to a terminating P-CSCF 110B. The originating P-CSCF 110A is coupled to a first user endpoint ("UE") 112A operated by the caller party. The terminating P-CSCF 110B is coupled to a second UE 12B operated by a callee party. In one embodiment, the first UE 112A and the second UE 112B are VoIP telephones. Other embodiments of the UEs 112A, 112B may include, but are not limited to, an IP telephone, an analog telephony adapter ("ATA") with an attached analog phone attached, a softphone computer application, and a 3G IMS capable handheld device.

The originating AS 106A, the originating S-CSCF 108A, and the originating P-CSCF 110A are associated with an originating standby AS 106C, an originating standby S-CSCF 108C, and an originating standby P-CSCF 110C, respectively. The terminating AS 106B, the terminating S-CSCF 108B, and the terminating P-CSCF 110B are associated with a terminating standby AS 106D, a terminating standby S-CSCF 108D, and a terminating standby P-CSCF 110D, respectively. The originating AS 106A, the originating S-CSCF 108A, the originating P-CSCF 110A, the terminating AS 106B, the terminating S-CSCF 108B, and the terminating P-CSCF 110B are collectively referred to as primary call processors 106A, 106B, 108A, 108B, 110A, 110B and are enclosed by solid lines. The originating standby AS 106C, the originating standby S-CSCF 108C, the originating standby P-CSCF 110C, the terminating standby AS 106D, the terminating standby S-CSCF 108D, and the terminating standby P-CSCF 110D are collectively referred to as standby call processors 106C, 106D, 108C, 108D, 110C, 110D and are enclosed by dotted lines.

It should be appreciated that the labels "caller party," "callee party," "originating," and "terminating" are merely illustrative and not intended to be limiting. In particular, if the first UE 112A receives an incoming call, then the first UE 112A becomes a "callee" and the "originating" call processors 106A, 106C, 108A, 108C, 110A, 110C become "terminating" call processors. Further, if the second UE 112B makes an outgoing call, then the second UE 112B becomes a "caller" and the "terminating" call processors 106B, 106D, 108B, 108D, 110B, 110D become "originating" call processors.

According to exemplary embodiments, the HSS 102 includes a master database that contains subscription information and supports the NGN for handling calls between the UEs 112A, 112B. The I-CSCF 104 is a call processor that can query the HSS 102 to retrieve the location (e.g., IP address) of the UEs 112A, 112B and route SIP calls to their assigned S-CSCFs 108A, 108B. The S-CSCFs 108A, 108B are call processors that can handle SIP registrations that associate the UEs 12A, 112B to their given locations. The S-CSCFs 108A, 108B can also route SIP messages to the appropriate ASs 106A, 106B in order to provide requested services offered by the ASs 106A, 106B. The ASs 106A, 106B host and execute value-added IMS services (e.g., caller identification ("ID"), call waiting, push-to-talk, etc.). The P-CSCFs 110A, 110B are call processors that provide a point of contact between the UEs 112A, 112B and the S-CSCFs 108A, 108B. It should be appreciated that the operations of the HSS 102, the I-CSCF 104, the ASs 106A, 106B, the S-CSCFs 108A, 108B, and the P-CSCFs 110A, 110B are well known to those skilled in the art and, as such, are not described in greater detail herein. Further, while only the HSS 102, the I-CSCF 104, the ASs 106A, 106B, the S-CSCFs 108A, 108B, and the P-CSCFs 110A, 110B are shown for the sake of simplicity, the architecture 100 may include other functional entities, such as a media gateway control function ("MGCF"), as defined by the 3GPP for the IMS. The MGCF is used as part of the call control/signaling path if an IMS UE (e.g., the UE 112A) calls to or receives a call from a Public Switched Telephone Network ("PSTN") phone.

According to embodiments, call state information (not shown) is stored in the primary call processors 106A, 106C, 108A, 108C, 110A, 110C when a call session is established between the first UE 112A and the second UE 112B. The call state information may include, but is not limited to, identification information for the UEs 112A, 112B, identification information for the call session, a time when the call session was set up, and an indication whether the call session is still in progress. The call state information may be utilized by a variety of SIP requests while the call session is in progress. In one example, as described in greater detail below with reference to FIGS. 2 and 3, the call state information may be retrieved by one of the primary call processors 106A, 106C, 108A, 108C, 110A, 110C after a SIP session timer refreshes to determine whether a call session is still in progress. In another example, as described in greater detail below with reference to FIGS. 4 and 5, the call state information may be retrieved by one of the primary call processors 106A, 106C, 108A, 108C, 110A, 110C in order to modify the call session (e.g., conferencing in another party to modify a two-way call into a three-way call). In one embodiment, the call state information is stored in a real-time processing buffer or other suitable volatile memory. Thus, when a system fault, such as a reset or a power failure, occurs at one of the call processors 106A, 106C, 108A, 108C, 110A, 110C, the call state information may be completely erased from memory.

According to embodiments, after one of the primary call processors 106A, 106C, 108A, 108C, 110A, 110C fails due to the system fault, one of the corresponding standby call processors 106B, 106D, 108B, 108D, 110B, 110D is activated. As illustrated in FIG. 1, the originating S-CSCF 108A has failed as denoted by X marks 114A, 114B. After the originating S-CSCF 108A fails, the originating standby S-CSCF 108C is activated. Thus, the originating standby S-CSCF 108C, instead of the originating S-CSCF 108A, communicates with the originating AS 106A and the originating P-CSCF 110A by way of communication paths 116A, 116B illustrated as dotted lines. In one embodiment the originating S-CSCF 108A stores the call state information in a volatile memory, which is lost during the system fault. In the example illustrated in FIG. 1, the originating standby S-CSCF 108C does not include a copy of the call state information.

Although the originating S-CSCF 108A fails and the originating standby S-CSCF 108C is activated, the call session established between the UEs 112A, 112B remains operational until the call state information is requested via a SIP request. After the originating standby S-CSCF 108C receives the SIP request and determines that the call state information is not stored in memory, the originating standby S-CSCF 108C sends a call terminating error response (e.g., a SIP "481 Call/transaction does not exist" error response) to upstream and downstream call processors, thereby mistakenly and prematurely terminating the call session established between the UEs 112A, 112B. The call terminating error response is operative to cause the user access control ("UAC") to terminate a call.

According to embodiments, a novel SIP message is introduced that provides a non-call terminating error response. The non-call terminating error response may be sent by one of the standby call processors 106B, 106D, 108B, 108D, 110B, 110D as a result of an in-dialog SIP request upon a failure of a corresponding one of the primary call processors 106A, 106C, 108A, 108C, 110A, 110C. The non-call terminating error response may be operative to notify a requesting call processor or UE that the call state information may not be available due to a failover. Upon receiving the failover warning message, the requesting call processor or UE may terminate the SIP request while maintaining the stable call. The failover warning message may be implemented by the standby call processors 106B, 106D, 108B, 108D, 110B, 110D for a limited time. Upon the expiration of the limited time, the standby call processors 106B, 106D, 108B, 108D, 110B, 110D may revert to sending the call terminating error response. In one embodiment, the failover warning message is implemented in SIP in an unused 4XX SIP message.

The non-call terminating error response provides enhanced NGN performance during a failover, and in particular, when call state information is requested from one of the standby call processors 106B, 106D, 108B, 108D, 110B, 110D upon a failover. By sending a failover warning message instead of a call terminating error response upon a failover, a stable call is not mistakenly or prematurely ended. Thus, the caller party and the callee party utilizing the UEs 112A, 112B for the stable call can maintain communication even when the standby call processors 106B, 106D, 108B, 108D, 110B, 110D cannot fulfill a request for call state information. This eliminates the need for replicating call state information in real-time or near real-time between the primary call processors 106A, 106C, 108A, 108C, 110A, 110C and the standby call processors 106B, 106D, 108B, 108D, 110B, 110D.

Figure 2:
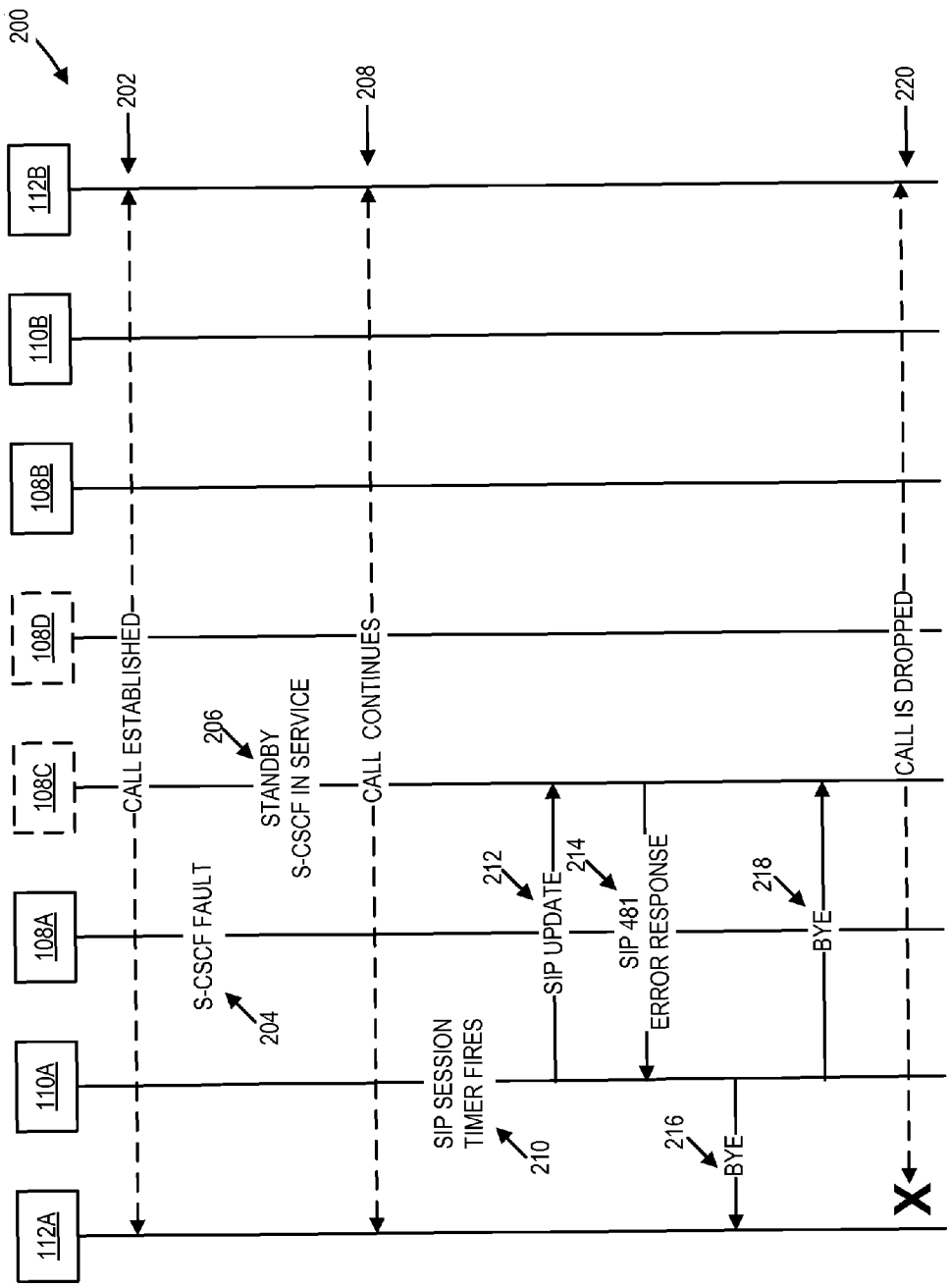
FIG. 2 is a diagram illustrating a conventional call flow between two user endpoints after a SIP session timer fires.

FIG. 2 is a diagram of a conventional call flow 200 after a SIP session timer fires. The call flow 200 illustrates the UEs 112A, 112B, the P-CSCFs 110A, 110B, the S-CSCFs 108A, 108B, and the standby S-CSCFs 108C, 108D. The other call processors, such as the ASs 106A, 106B, have been omitted from the call flow 200 for the sake of the simplicity. The call flow 200 is described in terms of call session states 202, 208, 220, call processor events 204, 206, 210, and a series of chronological steps 212, 214, 216, 218. The call session states 202, 208, 220 are illustrated as dotted arrows, while the steps 212, 214, 216, 218 are illustrated as solid arrows.

As illustrated in FIG. 2, the call flow 200 begins at the first call session state 202, where a call session is established between the UEs 12A, 112B. For example, the first UE 112A may initiate a call with the second UE 112B. After the call session is established, the originating S-CSCF 108A experiences a failure due to a system fault, as illustrated in the first call processor event 204. In response to the originating S-CSCF 108A failing, the originating standby S-CSCF 108C is activated, as illustrated in the second call processor event 206. As a result of being activated, the originating standby S-CSCF 108C assumes the identity of the originating S-CSCF 108A.

As illustrated in the second call session state 208, the call session between the first UE 112A and the second UE 112B continues even after the failover. That is, the users operating the first UE 112A and the second UE 112B may be completely unaware of the failover since the call session is still operational. However, at some point after the failover, a SIP session timer in the originating P-CSCF 110A fires, as illustrated in the third call processor event 210. Upon the SIP session timer firing, the originating P-CSCF 110A sends a SIP UPDATE message to the originating standby S-CSCF 108C, as illustrated in the first step 212.

The SIP UPDATE message requires the originating standby S-CSCF 108C to retrieve call state information. However, it is presumed in the call flow 200 that the call state information is lost during the failover. As a result, in response to the SIP UPDATE message, the originating standby S-CSCF 108C sends a call terminating error response, such as a SIP "481 Call/transaction does not exist" error response indicating that a call/transaction does not exist, to the originating P-CSCF 110A, as illustrated in the second step 214. The call flow 200 then proceeds to the third step 216 and the fourth step 218 where, upon receiving the call terminating error response, the originating P-CSCF 110A sends SIP BYE messages to the first UE 112A and the originating standby S-CSCF 108C, respectively, in order to terminate the call session. The terminated call session is illustrated in the third call session state 220.

Figure 3:
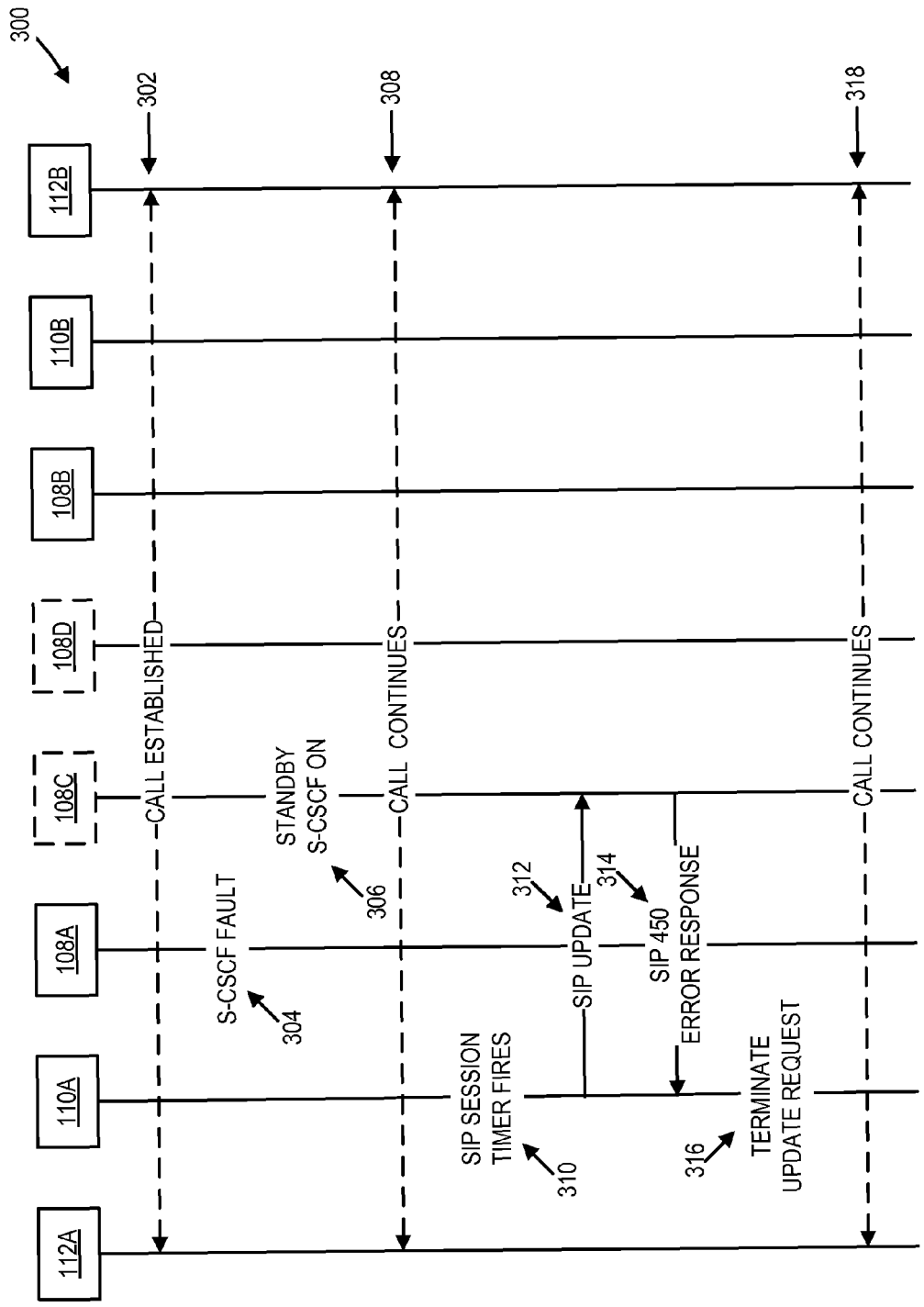
FIG. 3 is a diagram illustrating a call flow between two user endpoints after a SIP session timer fires, in accordance with exemplary embodiments.

FIG. 3 is a diagram of a call flow 300 implementing the non-call terminating error response after a SIP session timer fires in accordance with exemplary embodiments. In particular, the non-call terminating error response is implemented to replace the call terminating error response, as described in greater detail above with respect to the call flow 200 of FIG. 2, at least for a given period of time. Unlike the call terminating error response, which is operative to cause the UAC to terminate the call, the non-call terminating error response is operative to not cause the UAC to terminate the call. The call flow 300 operates under the same call processor configuration as described with respect to the call flow 200. The call flow 300 is described in terms of call session states 302, 308, 318, call processor events 304, 306, 310, 316 and a series of chronological steps 312, 314. The call session states 302, 308, 318 are illustrated as dotted arrows, while the steps 312, 314 are illustrated as solid arrows.

As illustrated in FIG. 3, the call flow 300 begins at the first call session state 302, where a call session is established between the UEs 112A, 112B. After the call session is established, the originating S-CSCF 108A experiences a failure due to a system fault, as illustrated in the first call processor event 304. In response to the originating S-CSCF 108A failing, the originating standby S-CSCF 108C is activated, as illustrated in the second call processor event 306. As a result of being activated, the originating standby S-CSCF 108C assumes the identity of the originating S-CSCF 108A.

As illustrated in the second call session state 308, the call session between the first UE 112A and the second UE 112B continues after the failover. At some point after the failover, a SIP session timer in the originating P-CSCF 110A fires, as illustrated in the third call processor event 310. Upon the SIP session timer firing, the originating P-CSCF 110A sends a SIP UPDATE message to the originating standby S-CSCF 108C, as illustrated in the first step 312. In response to the SIP UPDATE message, the originating standby S-CSCF 108C sends a non-call terminating error response, as illustrated in the second step 314. The non-call terminating error response is illustrated as a SIP "450 Call/transaction unknown" error response in FIG. 3. Upon receiving the non-call terminating error response, the originating P-CSCF 110A terminates the UPDATE request caused by the SIP session timer firing, as illustrated in the fourth call processor event 316, thereby preserving the call session. The operational call session is illustrated in the third call session state 318.

Figure 4:
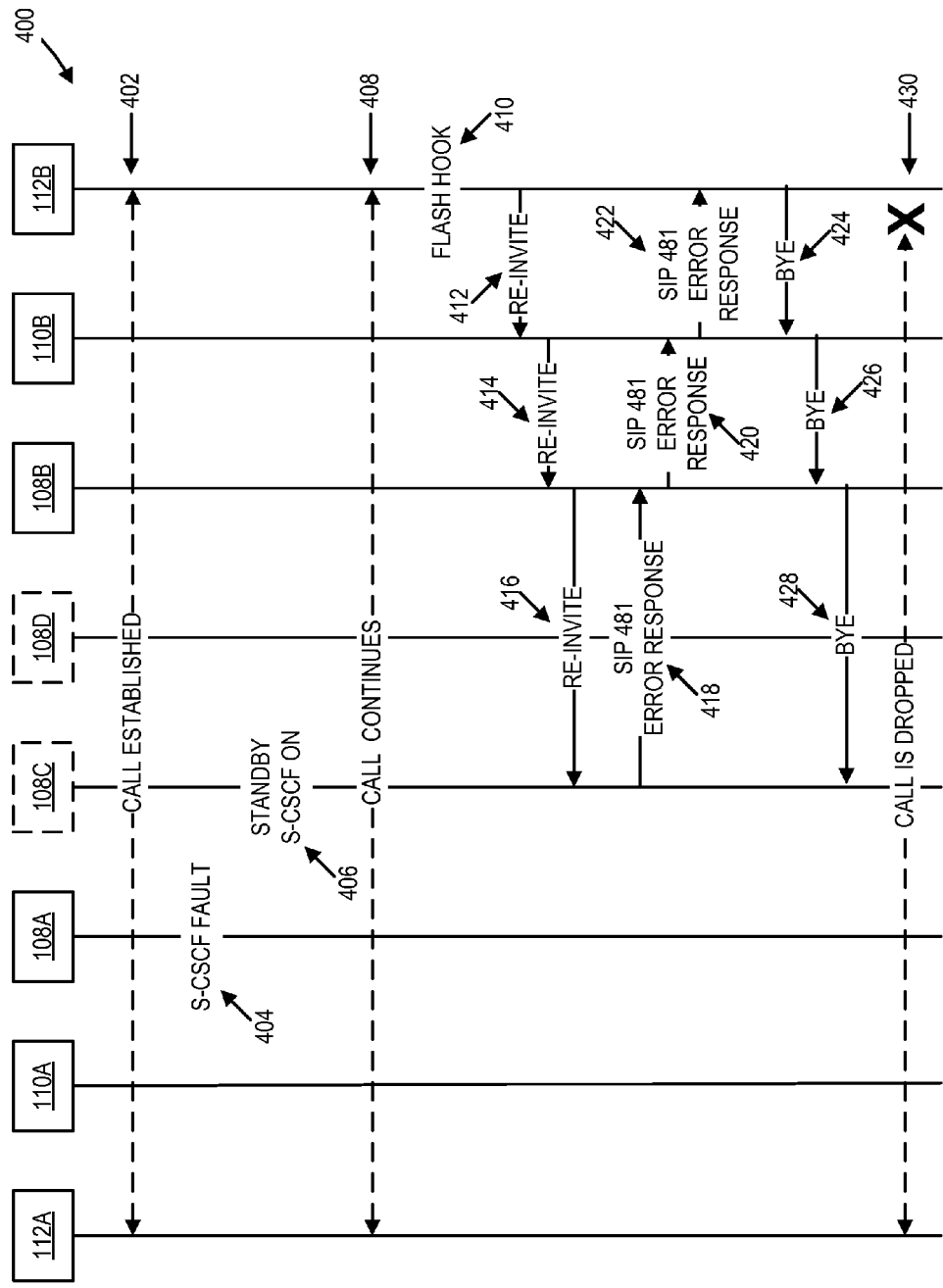
FIG. 4 is a diagram illustrating a conventional call flow between two user endpoints after one of the user endpoints performs a flash hook.

FIG. 4 is a diagram of a conventional call flow 400 after a flash hook is performed at one of the UEs 12A, 112B. The call flow 400 operates under the same call processor configuration as described with respect to the call flow 200. The call flow 400 is described in terms of call session states 402, 408, 430, call processor events 404, 406, a user event 410, and a series of chronological steps 412, 414, 416, 418, 420 422, 424, 426, 428. The call session states 402, 408, 430 are illustrated as dotted arrows, while the steps 412, 414, 416, 418, 420 422, 424, 426, 428 are illustrated as solid arrows.

As illustrated in FIG. 4, the call flow 400 begins at the first call session state 402, where a call session is established between the UEs 112A, 112B. After the call session is established, the originating S-CSCF 108A experiences a failure due to a system fault, as illustrated in the first call processor event 404. In response to the originating S-CSCF 108A failing, the originating standby S-CSCF 108C is activated, as illustrated in the second call processor event 406. As a result of being activated, the originating standby S-CSCF 108C assumes the identity of the originating S-CSCF 108A.

As illustrated in the second call session state 408, the call session between the first UE 112A and the second UE 112B continues after the failover. At some point after the failover, a flash hook is performed at the second UE 112B, as illustrated in the user event 410. For example, the user operating the second UE 112B may perform a flash hook in order to initiate a value-added service, such as call-waiting or three-way calling. Upon the flash hook being performed at the second UE 112B, the second UE 112B sends a SIP RE-INVITE message to the terminating P-CSCF 110B, as illustrated in the first step 412. As illustrated in the second step 414 and the third step 416, the SIP RE-INVITE message is then forwarded from the terminating P-CSCF 110B to the terminating S-CSCF 108B and from the terminating S-CSCF 108B to the originating standby S-CSCF 108C.

The SIP RE-INVITE message requires the originating standby S-CSCF 108C to retrieve call state information. However, it is presumed in the call flow 400 that the call state information is lost during the failover. As a result, in response to the SIP RE-INVITE message, the originating standby S-CSCF 108C sends a call terminating error response, such as a SIP "481 Call/transaction does not exist" error response indicating that a call/transaction does not exist, to the terminating S-CSCF 108B, as illustrated in the fourth step 418. As illustrated in the fifth step 420 and the sixth step 422, the call terminating error response is then forwarded from the terminating S-CSCF 108B to the terminating P-CSCF 110B and from the terminating P-CSCF 110B to the second UE 112B.

The call flow 400 then proceeds to the seventh step 424 where, upon receiving the call terminating error response, the second UE 112B sends a SIP BYE message to the terminating P-CSCF 110B in order to terminate the call session. As illustrated in the seventh step 426 and the eighth step 428, the SIP BYE message is then forwarded from the terminating P-CSCF 110B to the terminating S-CSCF 108B and from the terminating S-CSCF 108B to the originating standby S-CSCF 108C. The terminated call session is illustrated in the third call session state 430.

Figure 5:
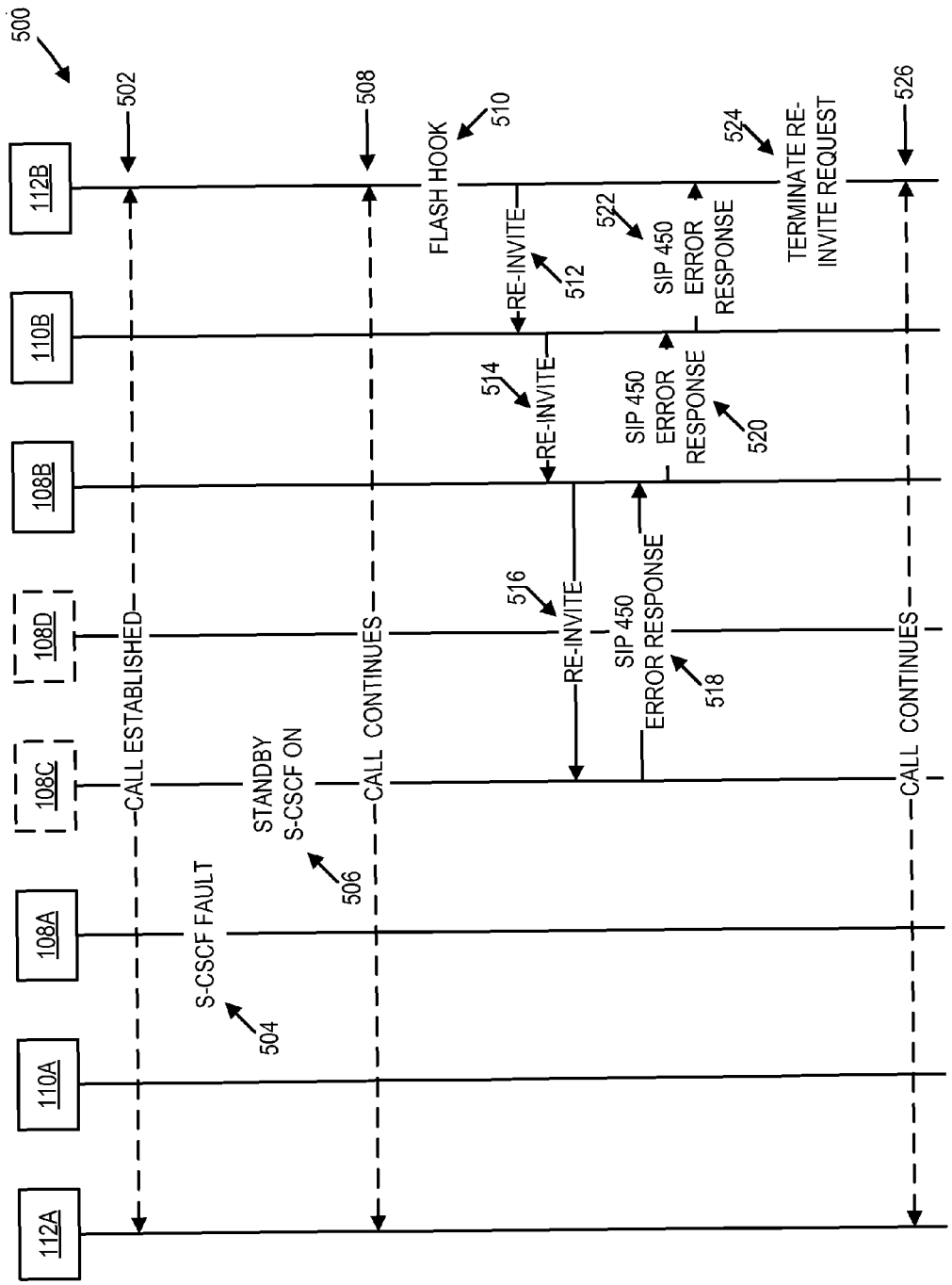
FIG. 5 is a diagram illustrating a call flow between two user endpoints after one of the user endpoints performs a flash hook, in accordance with exemplary embodiments.

FIG. 5 is a diagram of a call flow 500 implementing the non-call terminating error response after a flash hook is performed at one of the UEs 112A, 112B in accordance with exemplary embodiments. In particular, the non-call terminating error response is implemented to replace the call terminating error response, as described in greater detail above with respect to the call flow 400 of FIG. 4, at least for a given period of time. As previously described, the call terminating error response (e.g., a SIP "481 Call/transaction does not exist" error response) is operative to cause the UAC to terminate the call, while the non-terminating error response (e.g., a SIP "450 Call/transaction Unknown" error response) is operative to not cause the UAC to terminate the call. The call flow 500 operates under the same call processor configuration as described with respect to the call flow 200. The call flow 500 is described in terms of call session states 502, 508, 526, call processor events 504, 506, 524, a user event 510, and a series of chronological steps 512, 514, 516, 518, 520, 522. The call session states 502, 508, 526 are illustrated as dotted arrows, while the steps 512, 514, 516, 518, 520, 522 are illustrated as solid arrows.

As illustrated in FIG. 5, the call flow 500 begins at the first call session state 502, where a call session is established between the UEs 112A, 112B. After the call session is established, the originating S-CSCF 108A experiences a failure due to a system fault, as illustrated in the first call processor event 504. In response to the originating S-CSCF 108A failing, the originating standby S-CSCF 108C is activated, as illustrated in the second call processor event 506. As a result of being activated, the originating standby S-CSCF 108C assumes the identity of the originating S-CSCF 108A.

As illustrated in the second call session state 508, the call session between the first UE 112A and the second UE 112B continues after the failover. At some point after the failover, a flash hook is performed at the second UE 112B, as illustrated in the user event 510. Upon the flash hook being performed at the second UE 112B, the second UE 112B sends a SIP RE-INVITE message to the terminating P-CSCF 110B, as illustrated in the first step 512. As illustrated in the second step 514 and the third step 516, the SIP RE-INVITE message is then forwarded from the terminating P-CSCF 110B to the terminating S-CSCF 108B and from the terminating S-CSCF 108B to the originating standby S-CSCF 108C.

In response to the SIP RE-INVITE message, the originating standby S-CSCF 108C sends a non-call terminating error response to the terminating S-CSCF 108B, as illustrated in the fourth step 518. The non-call terminating error response is illustrated as a SIP "450 Call/transaction Unknown" error response in FIG. 5. As illustrated in the fifth step 520 and the sixth step 522, the non-call terminating error response is then forwarded from the terminating S-CSCF 108B to the terminating P-CSCF 110B and from the terminating P-CSCF 110B to the second UE 112B. Upon receiving the non-call terminating error response, the second UE 112B terminates the RE-INVITE request caused by the flash hook, as illustrated in the third call processor event 524, thereby preserving the call session. The operational call session is illustrated in the third call session state 526.

Figure 6A:
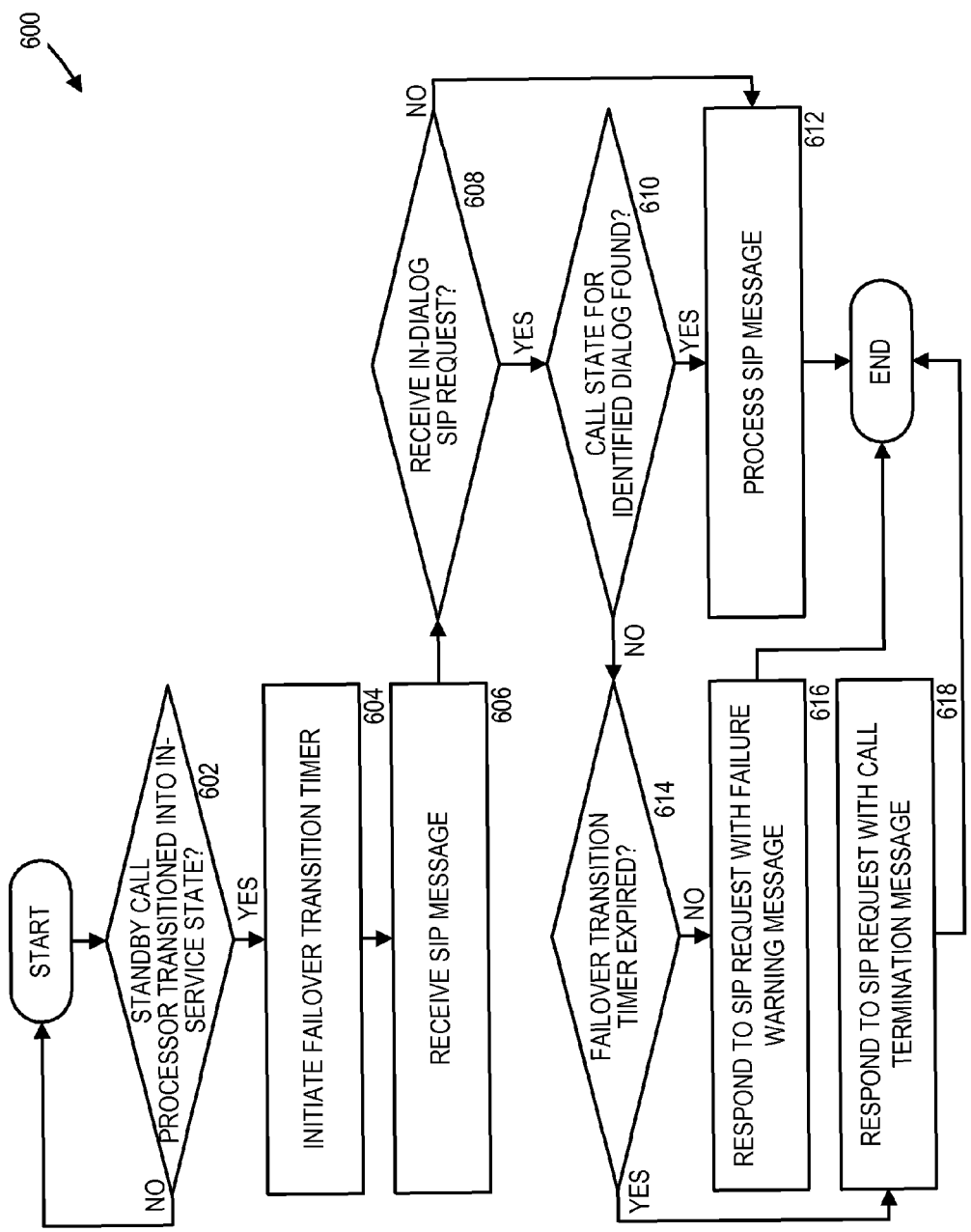
FIGS. 6A and 6B are flow diagrams illustrating a method for preserving stable calls during failover, in accordance with exemplary embodiments.
Figure 6B:
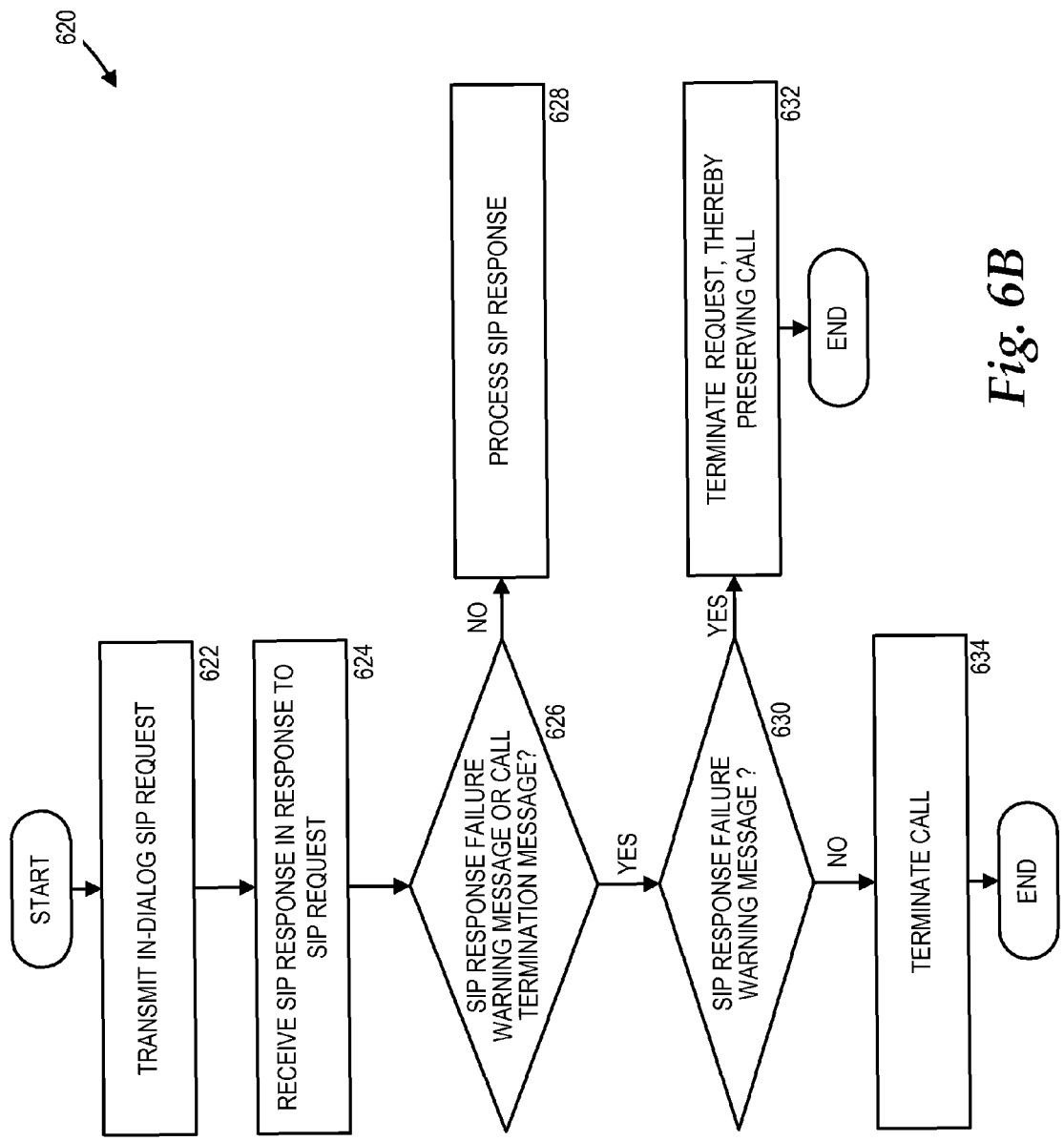

FIGS. 6A and 6B are flow diagrams illustrating methods 600, 620 for preserving stable calls during a failover, in accordance with exemplary embodiments. In particular, the method 600 of FIG. 6A describes the actions of a user agent server ("UAS"). The method 620 of FIG. 6B describes the actions of the UAC. In the examples described herein, the UAC refers to the UE or the call processor initiating the SIP request, and the UAS refers to the call processor responding to the SIP request. The UE or the call processor initiating the SIP request may also be referred to herein as a requester. According to embodiments, only UASs in a SIP proxy or a Back-to-Back User Agent ("B2BUA") are modified to implement the method 600. This may include P-CSCFs, S-CSCFs, and most ASs.

Figure 7:
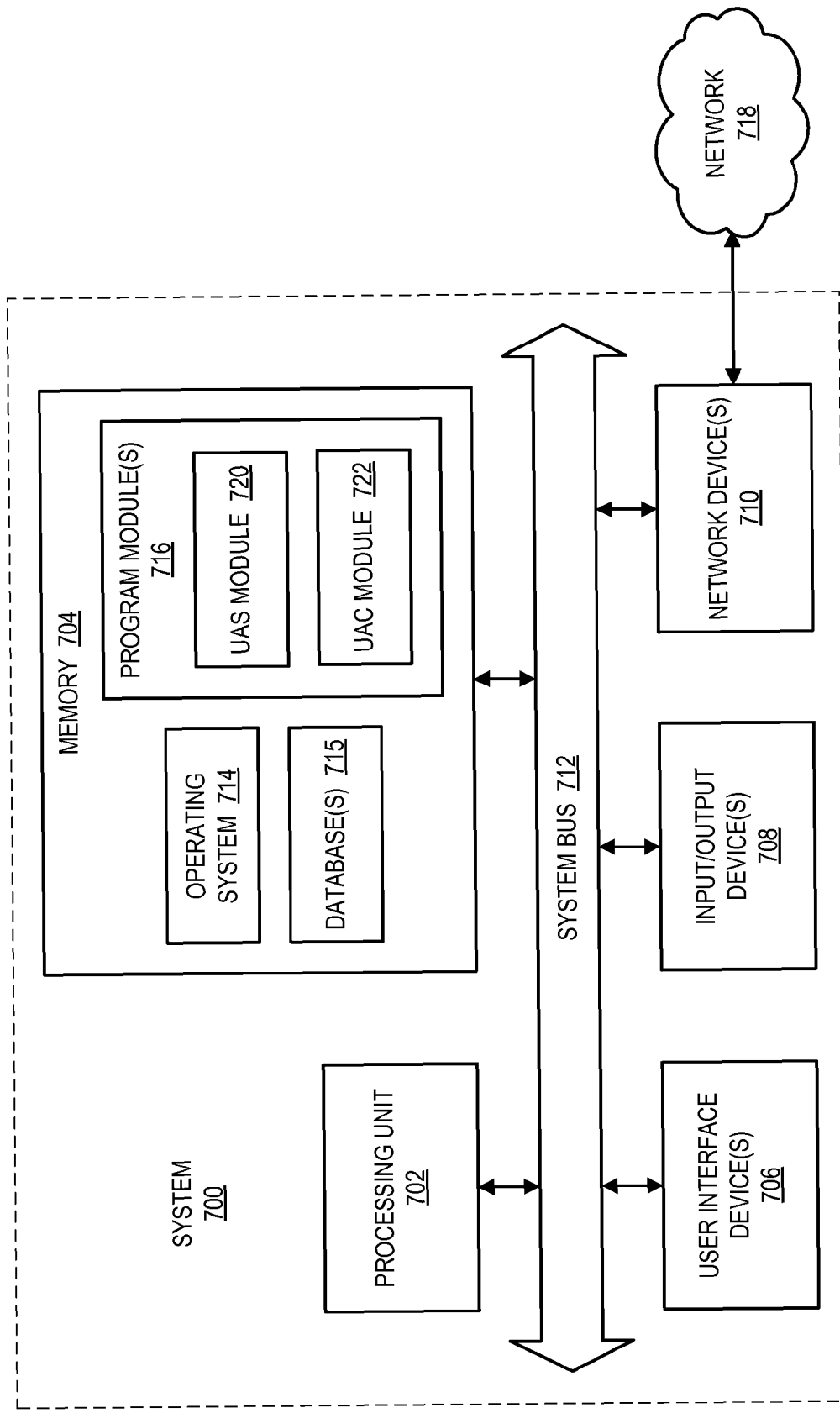
FIG. 7 is a computer architecture diagram showing aspects of an illustrative computer hardware architecture for a computing system capable of implementing aspects of the embodiments presented herein.

The methods 600, 620 may be embodied in hardware, software, firmware, or combinations thereof. In one embodiment, the method 600 is embodied in a stable call preservation UAS module 720 (hereinafter referred to as UAS module 720) as illustrated in FIG. 7. Further, the method 620 may be embodied in a stable call preservation UAC module 722 (hereinafter referred to as UAC module 722). The UAS module 720 and/or the UAC module 722 may be implemented in a user endpoint, such as the UEs 112A, 112B, a primary call processor, such as one of the primary call processors 106A, 106B, 108A, 108B, 110A, 110B, and/or a standby call processor, such as one of the standby call processors 106C, 106D, 108C, 108D, 110C, 110D. It should be appreciated that the UAS 720 and the UAC 722 may further include, in addition to the novel functionality described herein, standard functionality found on conventional UAC and UAS implementations as known to those skilled in the art.

According to the method 600, the UAS module 720 monitors and determines (at 602) whether a standby call processor, such as one of the standby call processors 106C, 106D, 108C, 108D, 110C, 110D, has transitioned into an in-service state. According to embodiments, the standby call processor transitions into the in-service state when a corresponding primary call processor, such as the primary call processors 106A, 106B, 108A, 108B, 110A, 110B experiences a system fault. For example, the primary call processor may be reset or suffer a power failure, thereby erasing any call state information stored in volatile memory.

In one embodiment, the UAS module 720 continues to monitor the standby call processor until it transitions into the in-service state. Responsive to determining that the standby call process transitions into the in-service state, the UAS module 720 initiates (at 604) a failover transition timer. The failover transition timer, as used herein, specifies an amount of time in which a non-call terminating error response replaces a call terminating error response after the failover. As described in greater detail below, the non-call terminating error response replaces the call terminating error response until the failover transition timer expires, according to one embodiment. In this case, after the failover transition timer expires, the call terminating error response is utilized instead of the non-call terminating error response.

At some point after the UAS module 720 initiates the failover transition timer, the UAS module 720 receives (at 606) a SIP message. Exemplary SIP messages include, but are not limited to, REGISTER, OPTIONS, INVITE, ACK, CANCEL, BYE, INFO, UPDATE, REFER, SUBSCRIBE, NOTIFY, and PUBLISH. Upon receiving the SIP message, the UAS module 720 determines (at 608) whether the SIP message is a SIP in-dialog request. If the SIP message is a SIP in-dialog request, then the UAS module 720 processes (at 612) the SIP message according to normal SIP standards as is known to those skilled in the art. If the SIP message includes an in-dialog SIP request, then the UAS module 720 determines (at 610) whether a call state can be found for the dialog specified in the in-dialog SIP request.

If the UAS module 720 finds the call state, for example in volatile memory, then the UAS module 720 processes (at 612) the SIP request according to normal SIP standards as is known to those skilled in the art. If the UAS module 720 does not find the call state, then the UAS module 720 determines (at 614) whether the failover transition timer has expired. If the UAS module 720 determines that the failover transition timer has not expired, then the UAS module 720 responds (at 616) to the SIP request by returning a non-call terminating error response. In one embodiment, the non-call terminating error response includes the current value of the failover transition timer. For example, the non-call terminating error response may include a header (e.g., Server-inservice-time: xxxxx seconds) configured to include the value of the failover transition timer. If the UAS module 720 determines that the failover transition timer has expired, then the UAS module 720 responds (at 618) to the SIP request by returning a call terminating error response.

According to the method 620 of FIG. 6B, the UAC module 722 transmits (at 622) an in-dialog SIP request. In response to transmitting the in-dialog SIP request, the UAC module 722 receives (at 624) a SIP response. Responsive to receiving the SIP response, the UAC module 722 determines (at 626) whether the SIP response is either a non-call terminating error response or a call terminating error response. If the UAC module 722 determines that the SIP response is neither a non-call terminating error response nor a call terminating error response, then the UAC module 722 processes (at 628) the SIP response according to normal SIP standards as is known to those skilled in the art. If the UAC module 722 determines that the SIP response is either a non-call terminating error response or a call terminating error response, then the UAC module 722 determines (at 630) whether the SIP response is a non-call terminating error response. If the UAC module 722 determines that the SIP response is a non-call terminating error response, then the UAC module 722 terminates (at 632) the SIP request, thereby preserving the call session. If the UAC module 722 determines that the SIP response is a call terminating error response (i.e., not a non-call terminating error response), then the UAC module 722 terminates (at 634) the call session. For example, the UAC module 722 may terminate the call session by transmitting SIP BYE messages to upstream and downstream call processors.

FIG. 7 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 7 is a block diagram illustrating a system 700 operative to preserve stable calls during failover, in accordance with exemplary embodiments. The system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710. Examples of the system 700 include, but are not limited to, computers, servers, personal digital assistants, cellular phones, or any suitable computing devices.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 704 communicates with the processing unit 702 via the system bus 712. In one embodiment, the memory 704 is operatively connected to a memory controller (not shown) that enables communication with the processing unit 702 via the system bus 712. The memory 704 includes an operating system 714, one or more databases 715, and one or more program modules 716, according to exemplary embodiments. As illustrated in FIG. 7, the memory 704 includes the UAS module 720 and the UAC module 722. As previously described, the method 600 as described above with respect to FIG. 6A may be embodied as the UAS module 720, and the method 620 described above with respect to FIG. 6B may be embodied in the UAC module 722. Examples of operating systems, such as the operating system 714, include, but are not limited to, WINDOWS and WINDOWS MOBILE operating systems from MICROSOFT CORPORATION, MAC OS operating system from APPLE CORPORATION, LINUX operating system, SYMBIAN OS from SYMBIAN SOFTWARE LIMITED, BREW from QUALCOMM INCORPORATED, and FREEBSD operating system.

By way of example, and not limitation, computer-readable media may comprise computer storage media and communication media. Computer storage media includes volatile and non-volatile, removable and non-removable media implemented in any method or technology for storage of information such as non-transitory computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 700.

The user interface devices 706 may include one or more devices with which a user accesses the system 700. The user interface devices 706 may include, but are not limited to, computers, servers, personal digital assistants, cellular phones, or any suitable computing devices. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the system 700 to communicate with other networks or remote systems via a network 718. Examples of network devices 710 may include, but are not limited to, a modem, a radio frequency ("RF") or infrared ("IR") transceiver, a telephonic interface, a bridge, a router, or a network card. The network 718 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 718 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for preserving stable calls during failover, comprising:

during a dialog between two user endpoints, determining whether a standby call processor has become operational, the standby call processor becoming operational when a corresponding primary call processor is in fault;

receiving a signaling protocol message wherein the signaling protocol message comprises a Session Initiation Protocol (SIP) message from a requester after the standby call processor becomes operational;

determining whether the signaling protocol message includes an in-dialog signaling protocol request;

responsive to determining that the signaling protocol message includes the in-dialog signaling protocol request, determining whether a call state associated with the dialog is found in memory; and responsive to determining that the call state associated with the dialog is not found in memory, returning a non-call terminating error response in response to the in-dialog signaling protocol request, the non-call terminating error response causing the requester to terminate the in-dialog signaling protocol request without terminating the dialog.

2. The method of claim 1, further comprising responsive to determining that the standby call processor has become operational, initiating a failover transition timer; and wherein responsive to determining that the call state associated with the dialog is not found in memory, returning a non-call terminating error response in response to the in-dialog signaling protocol request, the non-call terminating error response causing the requester to terminate the in-dialog signaling protocol request, comprises:

responsive to determining that the call state associated with the dialog is not found in memory, determining whether the failover transition timer has expired; and responsive to determining that the failover transition timer has expired, returning the non-call terminating error response in response to the in-dialog signaling protocol request, the non-call terminating error response causing the requester to terminate the in-dialog signaling protocol request.

3. The method of claim 2, further comprising responsive to determining that the failover transition timer has not expired, returning a call terminating error response in response to the in-dialog signaling protocol request, the call terminating error response causing the requester to terminate the dialog.

4. The method of claim 3, wherein the call terminating error response comprises a Session Initiation Protocol (SIP) "481 Call/transaction does not exist" error response.

5. The method of claim 2, wherein the non-call terminating error response comprises a header specifying a value of the failover transition timer.

6. The method of claim 1, wherein the in-dialog signaling protocol request comprises an in-dialog SIP request; and the method further comprising responsive to determining that the SIP message does not include the in-dialog SIP request, processing the SIP request according to SIP standards.

7. The method of claim 1, wherein the method further comprising responsive to determining that the call state associated with the dialog is found in memory, processing the SIP request according to SIP standards.

8. A system for preserving stable calls during failover, comprising:

a memory for storing a program for preserving stable calls during failover; and a processor functionally coupled to the memory, the processor being responsive to computer-executable instructions contained in the program and operative to:

during a dialog between two user endpoints, determine whether a standby call processor has become operational, the standby call processor becoming operational when a corresponding primary call processor is in fault, receive a signaling protocol message wherein the signaling protocol message comprises a Session Initiation Protocol (SIP) message from a requester after the standby call processor becomes operational, determine whether the signaling protocol message includes an in-dialog signaling protocol request, responsive to determining that the signaling protocol message includes the in-dialog signaling protocol request, determine whether a call state associated with the dialog is found in memory, and responsive to determining that the call state associated with the dialog is not found in memory, return a non-call terminating error response in response to the in-dialog signaling protocol request, the non-call terminating error response causing the requester to terminate the in-dialog signaling protocol request without terminating the dialog.

9. The system of claim 8, the processor being responsive to further computer-executable instructions contained in the program and operative to responsive to determining that the standby call processor has become operational, initiate a failover transition timer; and wherein responsive to determining that the call state associated with the dialog is not found in memory, to return a non-call terminating error response in response to the in-dialog signaling protocol request, the non-call terminating error response causing the requester to terminate the in-dialog signaling protocol request, the processor is further operative to:

responsive to determining that the call state associated with the dialog is not found in memory, determine whether the failover transition timer has expired, and responsive to determining that the failover transition timer has expired, return the non-call terminating error response in response to the in-dialog signaling protocol request, the non-call terminating error response causing the requester to terminate the in-dialog signaling protocol request.

10. The system of claim 9, the processor being responsive to further computer-executable instructions contained in the program and operative to responsive to determining that the failover transition timer has not expired, return a call terminating error response in response to the in-dialog signaling protocol request, the call terminating error response causing the requester to terminate the dialog.

11. The system of claim 9, wherein the non-call terminating error response comprises a header specifying a value of the failover transition timer.

12. The system of claim 8, wherein the in-dialog signaling protocol request comprises an in-dialog SIP request; and the processor being responsive to further computer-executable instructions contained in the program and operative to responsive to determining that the SIP message does not include the in-dialog SIP request, process the SIP request according to SIP standards.

13. The system of claim 8, wherein the processor being responsive to further computer-executable instructions contained in the program and operative to responsive to determining that the call state associated with the dialog is found in memory, process the SIP request according to SIP standards.

14. A non-transitory computer-readable medium having instructions stored thereon for execution by a processor to provide a method for preserving stable calls during failover, the method comprising:
- during a dialog between two user endpoints, determining whether a standby call processor has become operational, the standby call processor becoming operational when a corresponding primary call processor is in fault;
- receiving a signaling protocol message wherein the signaling protocol message comprises a Session Initiation Protocol (SIP) message from a requester after the standby call processor becomes operational;
- determining whether the signaling protocol message includes an in-dialog signaling protocol request;
- responsive to determining that the signaling protocol message includes the in-dialog signaling protocol request, determining whether a call state associated with the dialog is found in memory; and
- responsive to determining that the call state associated with the dialog is not found in memory, returning a non-call terminating error response in response to the in-dialog signaling protocol request, the non-call terminating error response causing the requester to terminate the in-dialog signaling protocol request without terminating the dialog.

15. The computer-readable medium of claim 14, the method further comprising responsive to determining that the standby call processor has become operational, initiating a failover transition timer; and
- wherein responsive to determining that the call state associated with the dialog is not found in memory, returning a non-call terminating error response in response to the in-dialog signaling protocol request, the non-call terminating error response causing the requester to terminate the in-dialog signaling protocol request, comprises:
  - responsive to determining that the call state associated with the dialog is not found in memory, determining whether the failover transition timer has expired; and
  - responsive to determining that the failover transition timer has expired, returning the non-call terminating error response in response to the in-dialog signaling protocol request, the non-call terminating error response causing the requester to terminate the in-dialog signaling protocol request.

16. The computer-readable medium of claim 15, the method further comprising responsive to determining that the failover transition timer has not expired, returning a call terminating error response in response to the in-dialog signaling protocol request, the call terminating error response causing the requester to terminate the dialog.

17. The computer-readable medium of claim 16, wherein the call terminating error response comprises a Session Initiation Protocol (SIP) "481 Call/transaction does not exist" error response.

18. The computer-readable medium of claim 15, wherein the non-call terminating error response comprises a header specifying a value of the failover transition timer.

19. The computer-readable medium of claim 14, wherein the in-dialog signaling protocol request comprises an in-dialog SIP request; and the method further comprising responsive to determining that the SIP message does not include the in-dialog SIP request, processing the SIP request according to SIP standards.

20. The computer-readable medium of claim 14, wherein the method further comprising responsive to determining that the call state associated with the dialog is found in memory, processing the SIP request according to SIP standards.

* * * * *